US009482739B2

(12) United States Patent
Mole et al.

(10) Patent No.: US 9,482,739 B2
(45) Date of Patent: Nov. 1, 2016

(54) INDOOR/OUTDOOR TRANSITION DETERMINATION

(75) Inventors: Stephen Mole, Mountain View, CA (US); Yan Lu, Cupertino, CA (US); Frank van Diggelen, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 856 days.

(21) Appl. No.: 13/588,618

(22) Filed: Aug. 17, 2012

(65) Prior Publication Data

US 2014/0002307 A1    Jan. 2, 2014

Related U.S. Application Data

(60) Provisional application No. 61/666,589, filed on Jun. 29, 2012.

(51) Int. Cl.
| | |
|---|---|
| *G01S 5/02* | (2010.01) |
| *G01S 19/48* | (2010.01) |
| *H04W 4/04* | (2009.01) |
| *H04W 52/02* | (2009.01) |

(52) U.S. Cl.
CPC ............ *G01S 5/0263* (2013.01); *G01S 19/48* (2013.01); *H04W 4/043* (2013.01); *H04W 52/0225* (2013.01)

(58) Field of Classification Search
CPC .... G01S 19/48; G01S 5/0263; H04W 4/043; H04W 64/00
See application file for complete search history.

(56) References Cited

U.S. PATENT DOCUMENTS

| | | | | |
|---|---|---|---|---|
| 5,892,454 A | * | 4/1999 | Schipper ................ | G01S 19/48 340/10.41 |
| 5,936,572 A | * | 8/1999 | Loomis ................ | G01C 21/206 342/357.29 |
| 6,166,685 A | * | 12/2000 | Soliman ................ | G01S 1/026 342/357.29 |

(Continued)

FOREIGN PATENT DOCUMENTS

| | | |
|---|---|---|
| EP | 2 034 271 A1 | 3/2009 |
| EP | 2 327 995 A2 | 6/2011 |

(Continued)

OTHER PUBLICATIONS

Office Action mailed Jul. 28, 2014, in U.S. Appl. No. 13/538,296, Fuller et al., filed Jun. 29, 2012.

(Continued)

*Primary Examiner* — Gregory C Issing
(74) *Attorney, Agent, or Firm* — Sterne, Kessler, Goldstein & Fox PLLC

(57) ABSTRACT

An apparatus and method is provided for indoor/outdoor transition detection of devices to improve selection of the navigation algorithms. To determine whether an outdoor-to-indoor transition has occurred, a mobile device can determine whether a difference between an indoor position determined using indoor position information and outdoor position determined using outdoor position information is less than a threshold and can conclude that the mobile device transitioned from outdoor to indoor of the structure, if the difference is less than the threshold. Also, to determine whether an indoor-to-outdoor transition has occurred, the mobile device can determine whether an indoor position survey area exists, determine whether an outdoor position determined based on outdoor position information is outside of the survey area, and determine whether a signal strength associated with the outdoor position location information is greater than a threshold.

4 Claims, 6 Drawing Sheets

(56) References Cited

U.S. PATENT DOCUMENTS

| | | | |
|---|---|---|---|
| 6,286,104 B1 | 9/2001 | Buhle et al. | |
| 7,184,745 B2 | 2/2007 | Ballantyne et al. | |
| 8,068,984 B2* | 11/2011 | Smith | G01C 21/165 455/456.1 |
| 8,339,372 B2 | 12/2012 | Rofougaran | |
| 2003/0182053 A1* | 9/2003 | Swope et al. | 701/207 |
| 2004/0176127 A1 | 9/2004 | Ballantyne et al. | |
| 2007/0239813 A1* | 10/2007 | Pinder | G01S 19/48 708/270 |
| 2009/0189810 A1* | 7/2009 | Murray | 342/357.14 |
| 2010/0291949 A1 | 11/2010 | Shapira et al. | |
| 2011/0156952 A1 | 6/2011 | Battacharya et al. | |
| 2011/0172906 A1 | 7/2011 | Das et al. | |
| 2011/0199259 A1 | 8/2011 | Karaoguz et al. | |
| 2011/0211511 A1* | 9/2011 | Bakthavathsalu | H04W 52/0254 370/311 |
| 2012/0169535 A1* | 7/2012 | Kong et al. | 342/357.49 |
| 2013/0065604 A1* | 3/2013 | Werner et al. | 455/456.1 |
| 2013/0137450 A1* | 5/2013 | Dai et al. | 455/456.1 |
| 2013/0183999 A1 | 7/2013 | Jovicic et al. | |
| 2014/0004876 A1 | 1/2014 | Fuller et al. | |

FOREIGN PATENT DOCUMENTS

| | | |
|---|---|---|
| EP | 2 364 049 A1 | 9/2011 |
| EP | 2 618 182 A1 | 7/2013 |
| TW | 201131463 A1 | 9/2011 |
| TW | 201202733 A1 | 1/2012 |
| WO | WO 2012/036028 A1 | 3/2012 |

OTHER PUBLICATIONS

Office Action directed to Taiwanese Patent Application No. 101147546, mailed Aug. 4, 2014; 7 pages.

Notice of Allowance mailed Nov. 20, 2014, in U.S. Appl. No. 13/538,296, Fuller et al., filed Jun. 29, 2012; 9 pages.

Notice of Allowability mailed Dec. 23, 2014, in U.S. Appl. No. 13/538,296, Fuller et al., filed Jun. 29, 2012; 6 pages.

Office Action mailed Dec. 18, 2012, in U.S. Appl. No. 13/538,296, Fuller et al., filed Jun. 29, 2012.

Office Action mailed Apr. 8, 2013, in U.S. Appl. No. 13/538,296, Fuller et al., filed Jun. 29, 2012.

Office Action mailed Jan. 24, 2014, in U.S. Appl. No. 13/538,296, Fuller et al., filed Jun. 29, 2012.

European Search Report directed to related European Patent Application No. EP 13 00 3196, Munich, Germany, mailed Nov. 27, 2013; 3 pages.

Communication from the Examining Division of the European Patent Office directed to related European Patent Application No. EP 13 00 3196, Munich Germany, Mailed Dec. 16, 2013; 5 pages.

English-Language Abstract for Japanese Patent Publication No. 2000-111648 A, published Apr. 21, 2000; 2 pages.

* cited by examiner

INDOOR/OUTDOOR TRANSITION DETERMINATION

CROSS-REFERENCE TO RELATED APPLICATIONS

The present application claims the benefit of U.S. Provisional Patent Application No. 61/666,589, filed on Jun. 29, 2012, which is incorporated herein by reference in its entirety.

BACKGROUND

Field of the Present Invention

The present invention relates generally to positioning and/or navigation algorithms and, more particularly, to a method and system for indoor/outdoor transition determination for mobile devices to improve selection of positioning and/or navigation algorithms.

Description of the Related Art

Many devices have the capability to use positioning and/or navigation algorithms (hereinafter referred to as navigation algorithm) to determine their location and/or to track their movements. Navigation algorithms can be generally divided into two broad categories based on whether the device is located inside a structure (e.g., indoor) or is located outside of the structure (e.g., outdoor). If the device is being used outdoors, then algorithms based on satellite navigation can be used. The satellite navigation can include, but not limited to, Global Navigation Satellite System (GNSS) such as Global Positioning System (GPS), Galileo, Compass, Doppler Orbitography and Radio-positioning Integrated by Satellite (DORIS), Low Earth Orbit Satellite Phone Networks, etc.

In contrast, when the device is being used indoors, navigation algorithms based on Indoor Positioning System (IPS) can be used to determine the location and/or to track the movements of the device. GNSS is generally not suitable to establish indoor locations, since microwaves will be attenuated and scattered by roofs, walls and other objects. In IPS, instead of relying on satellite, the system uses nearby nodes with known positions. Various optical, radio, acoustic, etc. technologies can be used for IPS. For example, cellular system, radio frequency transmitters in WiFi networks, Near Field Communication (NFC), ambient lighting levels/60 HZ flicker, sound, etc. can be used for indoor positioning.

Current implementations, however, cannot effectively and efficiently determine when a device transitions from indoors to outdoors or vice versa. Accordingly, the devices cannot efficiently use the correct algorithm for positioning or tracking purposes when the transition occurs, which would result in inaccurate calculations.

SUMMARY OF EMBODIMENTS

Therefore, apparatuses and methods are needed to efficiently determine when a device transitions between indoors and outdoors to effectively use the correct and appropriate navigation algorithm.

According to a first embodiment, there is provided a method for determining whether a difference between a first position of a mobile device determined using indoor position information and a second position of the mobile device determined using outdoor position information is less than a threshold. The method further includes concluding that the mobile device transitioned from outdoors to indoors of a structure, if the difference is less than the threshold.

According to another embodiment, there is provided a method for determining whether an indoor reference position exists for a structure. If the indoor reference position exists, the method further includes determining a difference between indoor reference position and a position determined based on outdoor position information. If the difference is greater than a first threshold, the method further includes determining whether a signal strength associated with the outdoor position location information is greater than a second threshold. If the signal strength associated with the outdoor position information is greater than the second threshold, the method further includes concluding that the mobile device transitioned from indoors to outdoors of the structure.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

Figure 1:
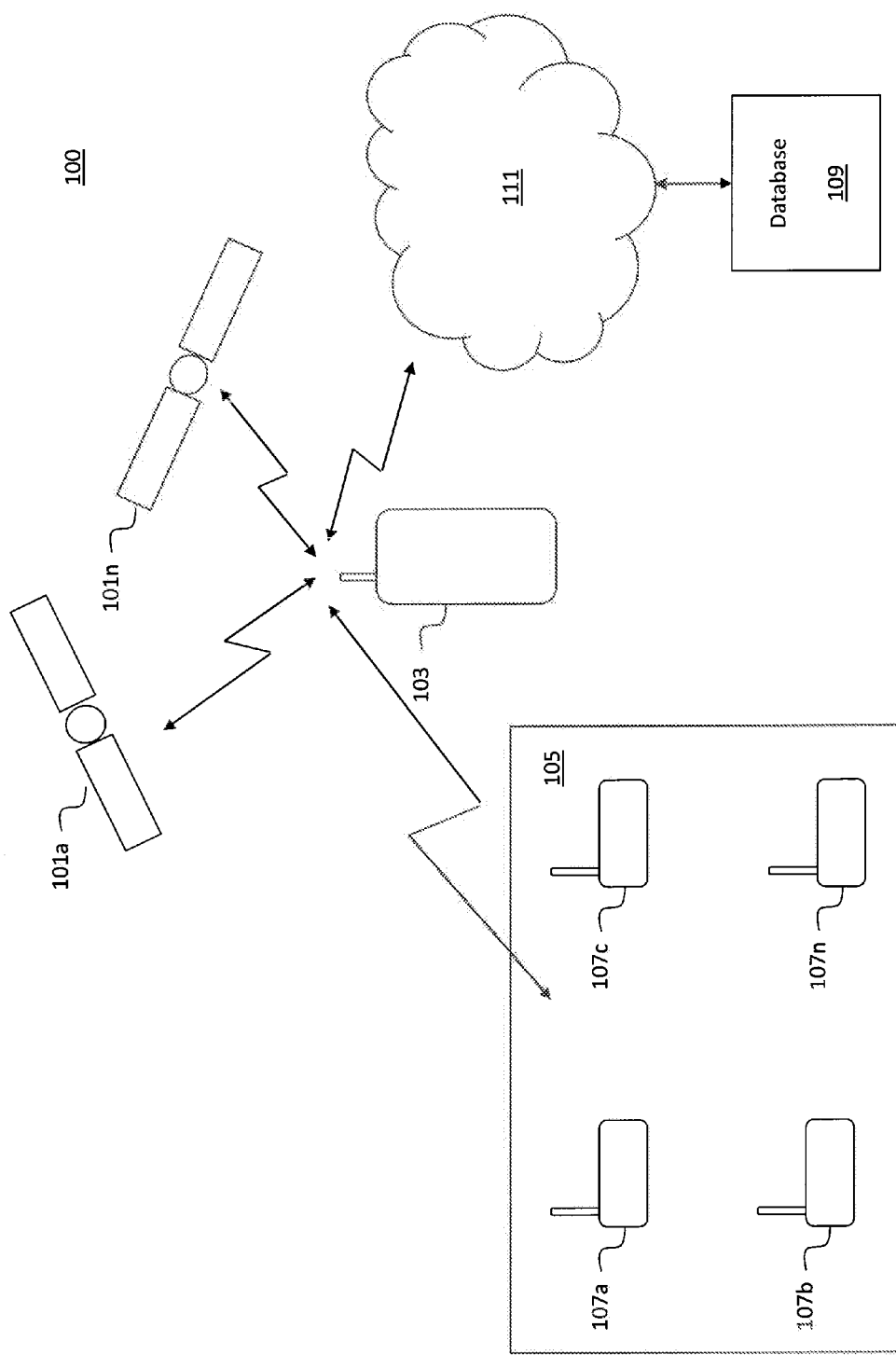
FIG. 1 illustrates a system, in accordance with an embodiment of the present disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present disclosure refers to the accompanying drawings that illustrate exemplary embodiments consistent with this disclosure. Other embodiments are possible, and modifications can be made to the embodiments within the spirit and scope of the present disclosure. Therefore, the detailed description is not meant to limit the present disclosure. Further, the scope of the present invention is defined by the appended claims.

It would be apparent to one of skill in the art that aspects of the present disclosure, as described below, can be implemented in many different embodiments of software, hardware, firmware, and/or the entities illustrated in the figures.

Any actual software code with the specialized control of hardware to implement the present disclosure is not limiting of the present disclosure. Thus, the operational behavior of the present disclosure will be described with the understanding that modifications and variations of the embodiments are possible, given the level of detail presented herein.

This specification discloses one or more embodiments that incorporate the features of this disclosure. The disclosed embodiment(s) merely exemplify the disclosure. The scope of the disclosure is not limited to the disclosed embodiment(s). Further, the invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Moreover, terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-steam or signaling-stream. The foregoing terms are utilized interchangeably in the subject specification and related drawings. Likewise, the terms "access point," "base station," "Node B," "evolved Node B (eNode B)," home Node B (HNB)," "home access point (HAP)," or the like, are utilized interchangeably in the subject specification and drawings, and refer to a wireless network component or apparatus that serves and receives data, control, voice, video, sound, gaming, or substantially any data-stream or signaling-stream from a set of subscriber stations. It is noted that in the subject specification and drawing, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 illustrates a system 100, according to an embodiment of the present disclosure. For example, system 100 can efficiently determine when a mobile device 103 transitions between indoors and outdoors to effectively use the appropriate navigation algorithm. In one example, system 100 comprises a mobile device 103 that can determine its location and/or track its movement using outdoor navigation algorithms using, for example, satellites 101a-101n and/or using indoor navigation algorithms using, for example, radio frequency sources 107a-107n, which are located inside a structure 105 and/or mobile device dead-reckoning sensors such as accelerometers, gyroscopes or magnetic field detectors.

In one example, mobile device 103, which can include, but not limited to mobile phone, smartphone, personal digital assistant (PDA), navigation device, portable computer, etc., can use outdoor navigation algorithms such as GNSS by communicating with the satellites 101a-101n. The outdoor navigation algorithms can result in more accurate location and/or navigation, when mobile device 103 is located outdoors, for example, outside of structure 105.

According to one example, satellites 101a-101n can be part of GPS, which includes, for example, up to 32 Medium Earth Orbit (MEO) satellites in six different orbital planes. Additionally or alternatively, satellites 101a-101n can be part of Galileo, which includes, for example, 30 MEO satellites. Although these exemplary systems are mentioned, it is noted that satellites 101a-101n can be part of any satellite navigation system. When mobile device 103 is located outdoors, mobile device 103 uses satellites 101a-101n for positioning and/or navigation purposes.

When mobile device 103 transitions from outdoor to indoor, for example, mobile device 103 enters structure 105, mobile device 103 can use RF sources 107a-107n and indoor positioning algorithms to more accurately determine its location and/or navigate its movements. According to one example, RF sources 107a-107n can include, but not limited to, any wireless technology such as access points (e.g., used in wireless local area networks (WLAN), WiFi networks, WiMAX networks, Bluetooth networks, etc.), Near Field Communication (NFC), sensor arrays, etc. It is noted that although RF sources are disclosed as exemplary embodiments, other systems can be used for indoor positioning. These systems can use ambient lighting levels/60 HZ flicker, sound, etc. to determine indoor positioning and/or to navigate indoors. This disclosure will refer to signals from nodes inside a structure as Location Beacon (LB) signals that are used for indoor positioning and/or navigation. As mentioned before, LB signals can include various optical, radio, acoustic, etc. signals that can be used for indoor positioning and/or navigation.

In one example, mobile device 103 is capable of determining whether an indoor/outdoor transition occurs, therefore, mobile device 103 can efficiently use the appropriate navigation algorithm. In one example, mobile device 103 can be in one of two states: an indoor state or an outdoor state. Mobile device 103 can regularly check whether its state has changed or it is still in the last state.

According to one example, mobile device 103 is in the outdoor state, meaning that mobile device 103 has previously determined that it is located outside of structure 105. To determine whether mobile device 103 is still located outdoors or has transitioned indoors, mobile device 103 can determine whether it can receive any LB signals from, for example, inside structure 105. If mobile device 103 does not sense any LB signal, mobile device 103 can determine that no outdoor-to-indoor transition has occurred and mobile device 103 is still in the outdoor state.

However, if mobile device 103 senses LB signals, mobile device 103 can use the sensed LB signals and indoor positioning algorithms to determine its position. Further, mobile device 103 can compare the determined position based on the sensed LB signals to its position determined based on outdoor positioning algorithms (such as GNSS). If the determined position based on the sensed LB signals and its outdoor position are not close (e.g., the difference between the positions is greater than a threshold) and the signals used for outdoor positioning (e.g., GNSS signals) are not weak, mobile device 103 can determine that it is still located outdoor and no outdoor-to-indoor transition has occurred. However, if the positions are not close and the signals used for outdoor positioning (e.g., GNSS signals) are weak, mobile device 103 can conclude that an outdoor-to-indoor transition has occurred or is occurring and mobile device 103 is located inside structure 105.

In one example, the strength of GNSS signals can be determined based on the number of GNSS satellites in track, GNSS signal strength on each channel, recent GNSS signal profile, etc. Herein, signal strength can be evaluated relative to some predefined threshold, signal-to-noise ratio, etc. Additionally or alternatively, the closeness of the determined indoor position and outdoor position can be defined based on GNSS signals' uncertainty, GNSS geometry, LB signals' uncertainty, etc.

Continuing with this exemplary embodiment, if mobile device 103 determines that the determined position based on the sensed LB signals and its outdoor position are close (e.g., the difference between the positions is less than or equal a threshold—indoor and outdoor positioning algorithms result in positions close to each other), mobile device 103 can check whether its state has recently changed. If mobile device 103 determines that its state has recently changed, mobile device 103 can conclude that it is still located outdoors and that no outdoor-to-indoor transition has occurred. This exemplary process precludes the mobile device 103 from jumping back and forth between the outdoor and indoor algorithms, more frequently than needed. The determination of "recently changed" can be relative to a predefined time period, or threshold. However, if mobile device 103 determines that its state has not recently changed, mobile device 103 can conclude that an outdoor-to-indoor transition has occurred or is about to occur.

Figure 2:
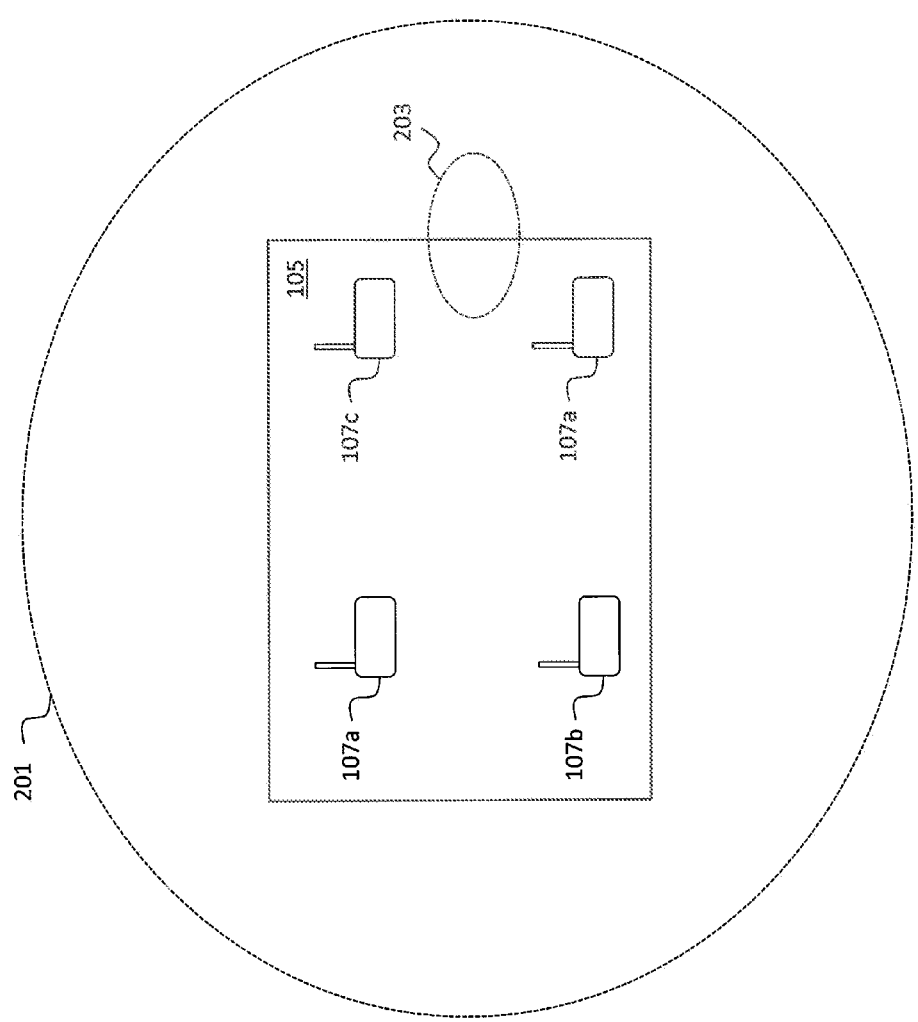
FIG. 2 illustrates a system, in accordance with an embodiment of the present disclosure.

The exemplary embodiment discussed above to determine an outdoor-to-indoor transition can be further illustrated according to the system of FIG. 2, according to an embodiment of the present disclosure. FIG. 2 illustrates an exemplary boundary 201 around structure 105, such that no LB signals can be detected outside boundary 201 due to spatial attenuation, etc. However, some LB signals can be sensed by mobile device 103, when mobile device 103 is located inside of boundary 201 but still outside of structure 105. Also, boundary 203 illustrates an exemplary boundary that an outdoor-to-indoor transition occurs.

If mobile device 103 is located outside boundary 201, mobile device 103 cannot sense any LB signal and therefore, can conclude that no outdoor-to-indoor transition has occurred. When mobile device 103 is located inside boundary 201 but outside structure 105, mobile device 103 can sense at least one LB signal. Therefore, in order to determine whether an outdoor-to-indoor transition has occurred, mobile device 103 determines a position using indoor position algorithms and based on the sensed LB signals and compares the determined position with a position determined based on outdoor position algorithms (such as GNSS).

If the comparison shows that the positions are not close (as discussed above) and further the signals used for outdoor positioning algorithms (e.g., GNSS signals) are not weak (as discussed above), mobile device 103 can conclude that it is located outside of structure 105, such as inside boundary 201.

If the comparison shows that the positions are not close (as discussed above) and further the signals used for outdoor positioning algorithms (e.g., GNSS signals) are weak (as discussed above), mobile device 103 can conclude that an outdoor-to-indoor transition has occurred, e.g., mobile device 103 is now transitioning or is located inside of structure 105, such as inside boundary 203 and/or inside structure 105.

If the comparison shows that the positions are close (as discussed above) and further mobile device 103 has recently changed states, mobile device 103 can conclude that it is still located outside of structure 105, such as inside boundary 201 but outside structure 105.

If the comparison shows that the positions are close (as discussed above) and further mobile device 103 has not recently changed states, mobile device 103 can conclude that an outdoor-to-indoor transition has occurred, e.g., mobile device 103 is now transitioning or is located inside of structure 105, such as inside boundary 203 and/or inside structure 105.

According to another exemplary embodiment, mobile device 103 is further capable of determining whether an indoor-to-outdoor transition occurred. In this example, mobile device 103 has previously determined to be in the indoor state. Mobile device 103 determines whether an LB surveyed area exists. An LB surveyed area can include, but not limited to, a map of structure 105. Additionally or alternatively, the LB surveyed area can include a fingerprint for structure 105, which can map, for example, radio frequency sources inside structure 105 and the strength of their signals to the map of structure 105. In one example, the LB surveyed area can be stored in a database 109, which can be accessed by mobile device 103. According to one example, mobile device 103 can communicate with database 109 through a communication network 111. In one example, communication network 111 can include, but is not limited to, personal area networks, local area network, mesh network, metropolitan area network, wide area network, mobile network (such as global system for mobile communications, personal communications service, digital advance mobile phone service, etc.), Internet, or the like. Although a separate database 109 is illustrated, it is noted that database 109 and/or a copy of database 109 can be included in mobile device 103 and/or can be downloaded in mobile device 103 when needed.

If the LB surveyed area exists, mobile device 103 determines whether a position determined using outdoor algorithms (e.g., GNSS) is outside the LB surveyed area. If the position determined using outdoor algorithms is not outside the LB surveyed area (e.g., it is inside the area, or no GNSS signal exists, etc.), mobile device 103 can conclude that no indoor-to-outdoor transition has occurred. However, if the position determined using outdoor algorithms is outside the LB surveyed area, or no LB surveyed area exists and the GNSS signals are strong (e.g., based on the number of GNSS satellites in track, GNSS signal strength on each channel, recent GNSS signal profile, etc.), mobile device 103 can conclude that an indoor-to-outdoor transition has occurred and changes its state from the indoor state to the outdoor state.

If the position determined using outdoor algorithms is outside the LB surveyed area and the GNSS signals are not strong, mobile device 103 can conclude that no indoor-to-outdoor transition has occurred. Again, signal strength can be evaluated relative to a predetermined threshold, signal-to-noise ratio, etc.

Figure 3:
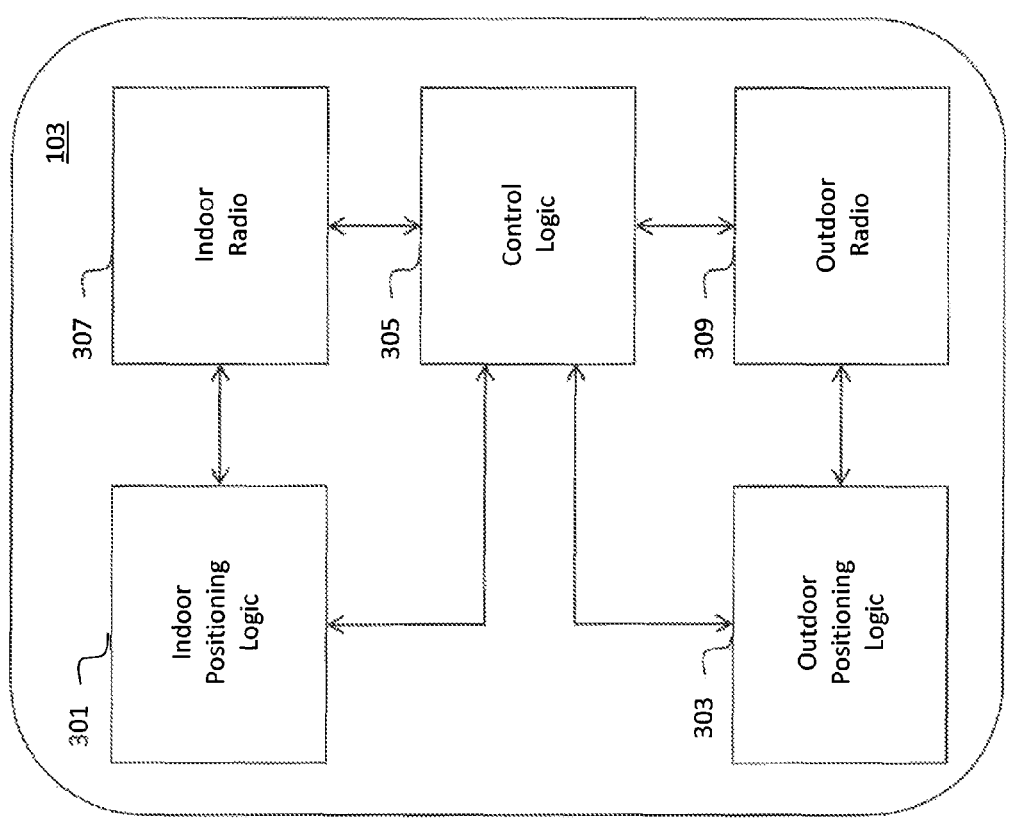
FIG. 3 illustrates a device, in accordance with an embodiment of the present disclosure.

FIG. 3 illustrates a device, according to an embodiment of the present disclosure. For example, the device illustrated in FIG. 3 can be implemented as mobile device 103 of FIG. 1. According to this example, mobile device 103 can include an indoor positioning logic 301, an outdoor positioning logic 303, and a control logic 305, in addition to other modules. According to one example, control logic 305 is configured to determine whether mobile device 103 has transitioned between indoors and outdoors, and based on this determination enable one of indoor positioning logic 301 or outdoor positioning logic 303 to perform positioning and/or navigation algorithms.

For example, when mobile device 103 is located outdoors, outdoor positioning logic 303, in cooperation with one or more radio receivers (e.g., outdoor radio 309), can use outdoor navigation algorithms to determine the position and/or track movements of mobile device 103. Additionally, when mobile device 103 is located indoors, indoor positioning logic 301, in cooperation with one or more radio receivers (e.g., indoor radio 307), can use indoor navigation algorithms to determine the position and/or track movements of mobile device 103. In this example, control logic 305 is configured to determine the state of mobile device 103 (indoor or outdoor) and determine whether the state has changed or not.

According to one example, when control logic 305 has previously determined that mobile device 103 is in the outdoor state (e.g., mobile device 103 is outside structure 105 of FIG. 1), control logic 305 is configured to determine (in cooperation with one or more receivers [not shown]) whether any LB signals can be sensed. Control logic 305 stays in outdoor state if no LB signal is sensed. Otherwise, control logic 305 is configured to compare a position determined using indoor positioning algorithms and using the sensed LB signals with a position determined using outdoor positioning algorithm. If the comparison determines that the positions are not close (as discussed above) and the outdoor positioning signals are not weak, control logic 305 stays in the outdoor state. However, if the comparison determines that the positions are not close (as discussed above) but the outdoor positioning signals are weak, control logic 305 determines that an outdoor-to-indoor transition has occurred and therefore, control logic 305 can enable indoor positioning logic 301 to use indoor navigation algorithms for positioning and/or tracking purposes. In one example, control logic 305 can disable outdoor positioning logic 303, reduce the power used by logic 303, and/or cause logic 303 to minimize its activities in order to save power for the mobile device 103.

If the position comparison determines that the positions are close (as discussed above), depending on how recently the state of mobile device 103 has changed, control logic 305 can determine whether a transition has occurred or not.

Additionally or alternatively, when control logic 305 has previously determined that mobile device 103 is in indoor state (e.g., mobile device 103 is inside structure 105 of FIG. 1), control logic 305 is configured to determine whether an LB survey area exists or not. In one example, control logic 305 is configured to use database 109 of FIG. 1 to determine and/or access the LB survey area. If the survey area does not exist or the survey area exists but a position determined based on outdoor positioning algorithm (e.g., GNSS) is located outside of the LB survey area, control logic 305 can rely on the strength of outdoor positioning signals to determine whether an indoor-to-outdoor transitioned has occurred. If the outdoor positioning signals (e.g., GNSS signals) are not strong enough (as discussed above), control logic 305 can conclude that no transition has occurred. However, if the outdoor positioning signals are strong, then control logic 305 can conclude that an indoor-to-outdoor transition has occurred and therefore, control logic 305 can enable outdoor positioning logic 303 to use outdoor navigation algorithms for positioning and/or tracking purposes. In one example, control logic 305 can disable indoor positioning logic 301, reduce the power used by logic 301, and/or cause logic 301 to minimize its activities in order to save power for the mobile device 103.

According to one example, if the survey area exists and the position determined based on outdoor positioning algorithm is not located outside of the LB survey area (e.g., the location is inside the LB survey area, no GNSS signal is available, etc.), control logic 305 can determine that no transition has occurred, and therefore the indoor positioning algorithm remains in use.

Figure 4:
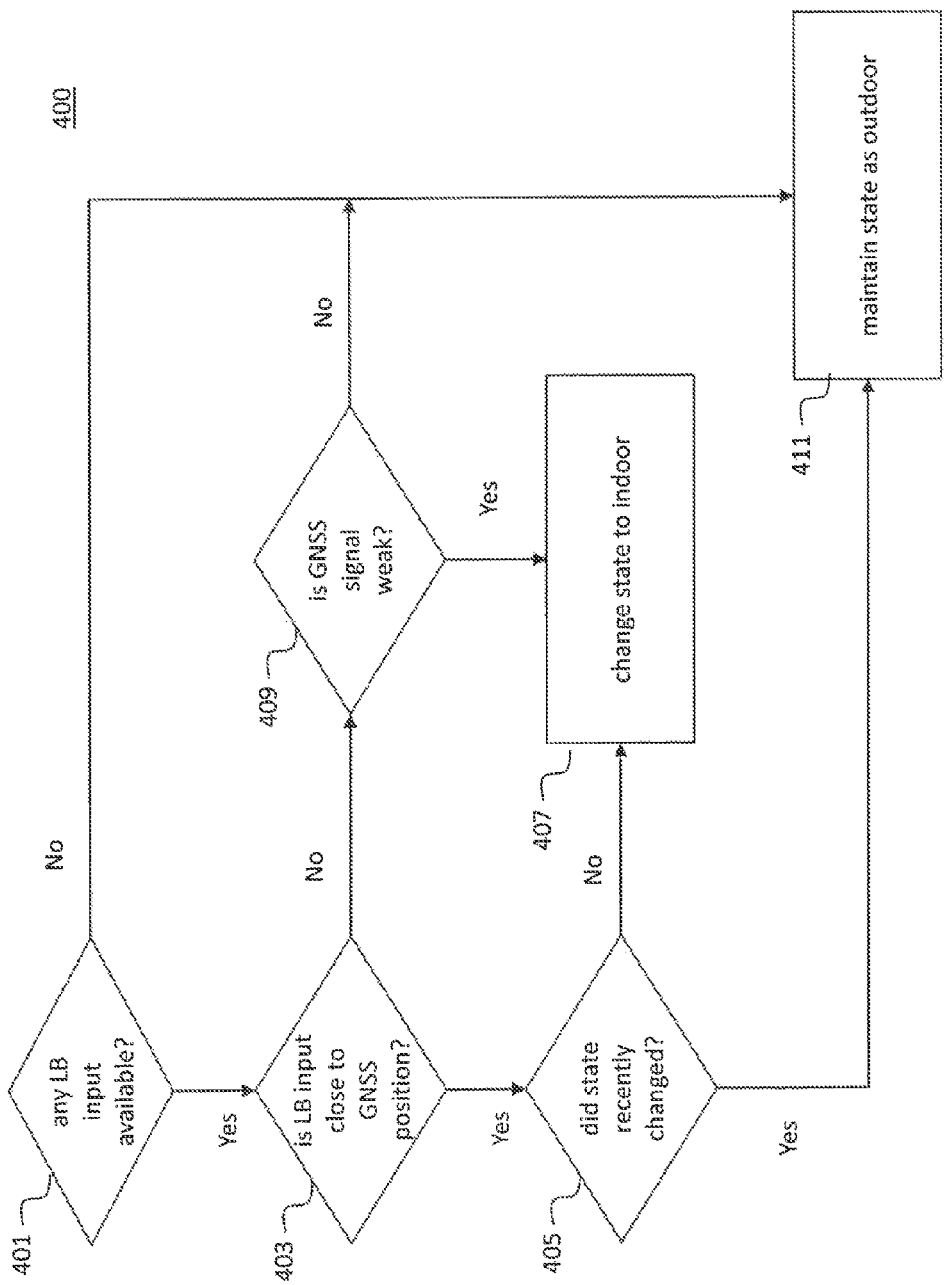
FIG. 4 is a flowchart illustrating a method, in accordance with an embodiment of the present disclosure.

FIG. 4 is a flowchart depicting a method 400, according to an embodiment of the present disclosure. For example, method 400 can efficiently determine whether a mobile receiver has transitioned from outdoors to indoors, to effectively use the proper navigation algorithm. In one example, method 400 is performed by system 100. It is to be appreciated not all steps may be needed, or performed in the order shown in FIG. 4. Reference is made to system 100 in FIG. 1 merely for convenience of discussion. Other systems may be used to perform the method, as will be understood by those skilled in the arts.

In step 401, a determination is made whether any LB signals are available. In one example, mobile device 103, which is located outside of structure 105, uses, for example, GNSS signals and an outdoor positioning algorithm for positioning and/or navigation purposes. The mobile device 103 can frequently check whether any LB signals can be sensed from, for example, structure 105, using various receivers. If no LB signal is available, then in step 411, a conclusion is made that mobile device 103 is still located outdoor. Accordingly, the outdoor state of mobile device 103 is maintained.

In step 403, if LB signals are available, a determination is made whether a position determined based on indoor positioning algorithms and the available LB signals is close (as discussed above) to a position determined based on outdoor positioning algorithms using, for example, the GNSS signals. In one embodiment, the indoor position, determined based on indoor positioning algorithms and the available LB signals, is calculated before the determination at step 403 is performed.

If the positions determined based on the available LB signals and the GNSS signals are not close (as discussed above), a determination is made in step 409 whether the GNSS signals are weak (as discussed above). In one example, depending on the criteria used to determine the strength of GNSS signals, thresholds are defined for comparison with the measured GNSS signals. If the GNSS signals are not weak, a conclusion is made in step 411 that mobile device 103 is still located outdoors. Accordingly, the outdoor state of mobile device 103 is maintained, and the outdoor positioning algorithms are still utilized.

However, if the GNSS signals are weak, a conclusion is made in step 407 that mobile device 103 has transitioned, or is transitioning, from outdoors to indoors. Accordingly, the state of mobile device 103 is changed to indoors and mobile device 103 can effectively use indoor positioning algorithms for more accurate positioning and/or navigation.

If the determined positions are close to each other (as discussed above), in step 405 a determination is made whether the indoor/outdoor state has recently changed. In one example, a time threshold has been predefined and the time elapsed from the last change in state is compared with the defined threshold. In one example, the determination of step 405 can prevent unnecessary frequent changes of state. If the indoor/outdoor state of the mobile device 103 has recently changed, a conclusion is made in step 411 that mobile device 103 is still located outdoors. Accordingly, the outdoor state of mobile device 103 is maintained.

However, if the indoor/outdoor state of, for example, mobile device 103 has not recently changed, a conclusion is made in step 407 that mobile device 103 has transitioned or is transitioning from outdoor to indoor. Accordingly, the state of mobile device 103 is changed to indoor and mobile device 103 can effectively use indoor positioning algorithms for more accurate positioning and/or navigation.

Figure 5:
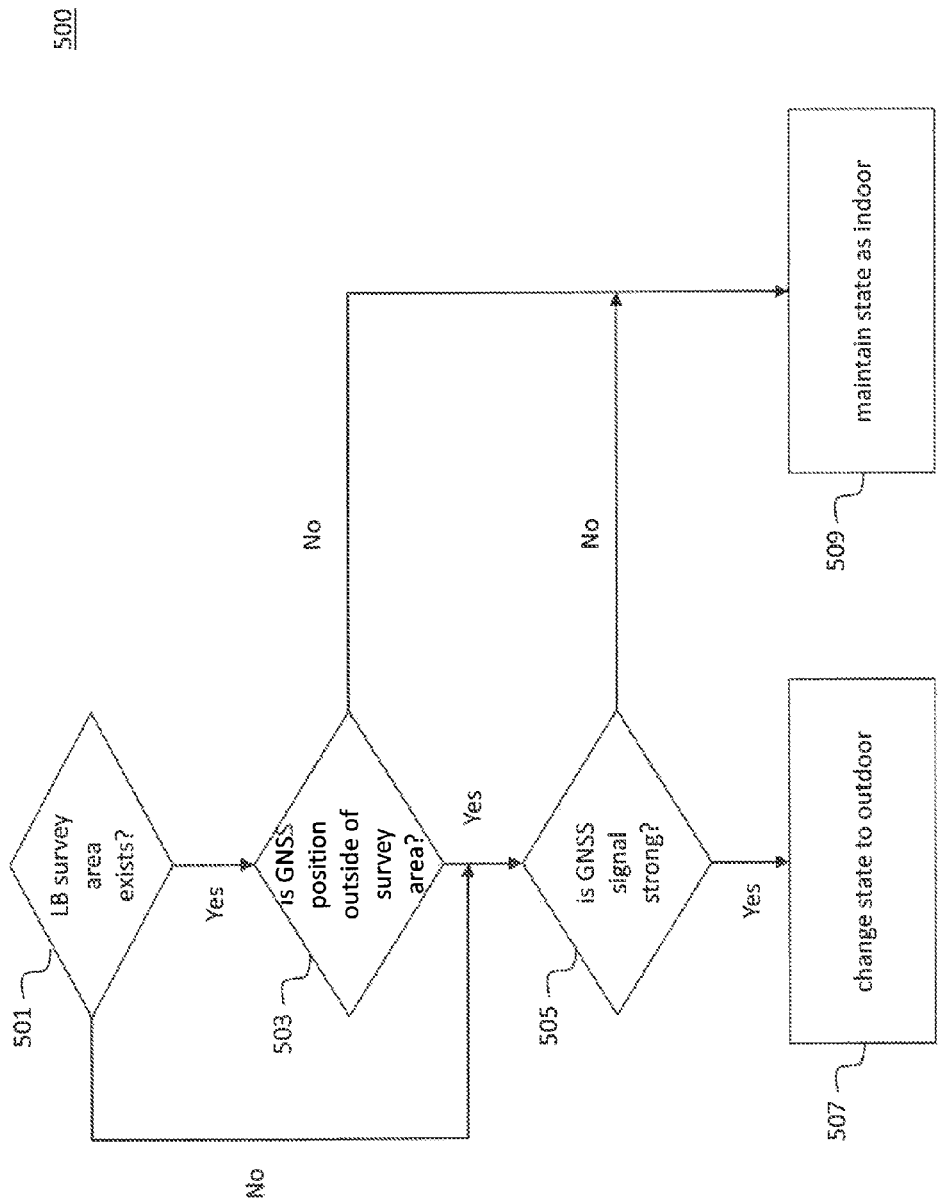
FIG. 5 illustrates a flowchart illustrating a method, in accordance with an embodiment of the present disclosure.

FIG. 5 is a flowchart depicting a method 500, according to an embodiment of the present invention. For example, method 500 can efficiently deter nine whether a mobile receiver has transitioned from indoors to outdoors, to effectively use the proper navigation algorithm. In one example, method 500 is performed by system 100. It is to be appreciated that not all steps may be needed, or performed in the order shown in FIG. 5. Reference is made to system 100 in FIG. 1 merely for convenience of discussion. Other system may be used to perform the method, as will be understood by those skilled in the arts.

In this example, it was previously known that mobile device 103 is in indoor state, for example, located inside structure 105 of FIG. 1, and can frequently check whether its indoor/outdoor state has changed. In step 501, a determination is made whether an LB surveyed area exists. As discussed above, an LB surveyed area can include, but not limited to, a map of a structure 105, including a fingerprint for structure 105, which can map, for example, radio frequency sources inside structure 105 and the strength of their signals to the map of structure 105. According to one example, the LB surveyed area can include one or more indoor reference positions, which are determined based on indoor location algorithms.

In step 503, a determination is made whether a position determined using outdoor algorithms (e.g., GNSS) is outside the LB surveyed area, if the LB surveyed area exists. If the position determined using outdoor algorithms is not outside the LB surveyed area (e.g., it is inside the area, no GNSS signal exists, etc.), or no GNSS signal is available, a conclusion is made in step 509 that no indoor-to-outdoor transition has occurred and the indoor state of mobile device 103 is maintained.

Additionally or alternatively, step 503 can include determining a difference between the position determined using outdoor algorithms and the one or more indoor reference positions included in the survey. In one example, if more than one indoor reference position is included in the survey, a difference between the position determined using outdoor algorithms and each of the indoor reference positions included in the survey is calculated. According to this example, an average of the calculated differences, the maximum difference, the minimum difference, and/or any function of the calculate differences can be used for further determinations whether an indoor-to-outdoor transition has occurred. According to one example, if the calculated difference (and/or a function of the calculated differences) is less than a threshold, a conclusion is made in step 509 that no indoor-to-outdoor transition has occurred and the indoor state of mobile device 103 is maintained.

However, if the position determined using outdoor algorithms is outside the LB surveyed area, no LB surveyed area exist, or the calculated difference (and/or a function of the calculated differences) between the position determined using outdoor algorithms and the one or more indoor positions included in the survey is greater than a threshold, a determination is made in step 505 on how strong the GNSS signals are (e.g., based on number of GNSS satellites in track, GNSS signal strength on each channel, recent GNSS signal profile, etc.). In one example, depending on the criteria used to determine the strength of GNSS signals, thresholds are defined for comparison with the measured GNSS signals.

In step 507, a conclusion is made that an indoor-to-outdoor transition has occurred and the state is change from indoor to outdoor, if the GNSS signals are strong. Accordingly, outdoor positioning algorithms can be used for more accurate positioning and/or navigation.

However, if the GNSS signals are not strong, a conclusion is made in step 509 that no indoor-to-outdoor transition has occurred, and therefore, the indoor state is maintained.

Figure 6:
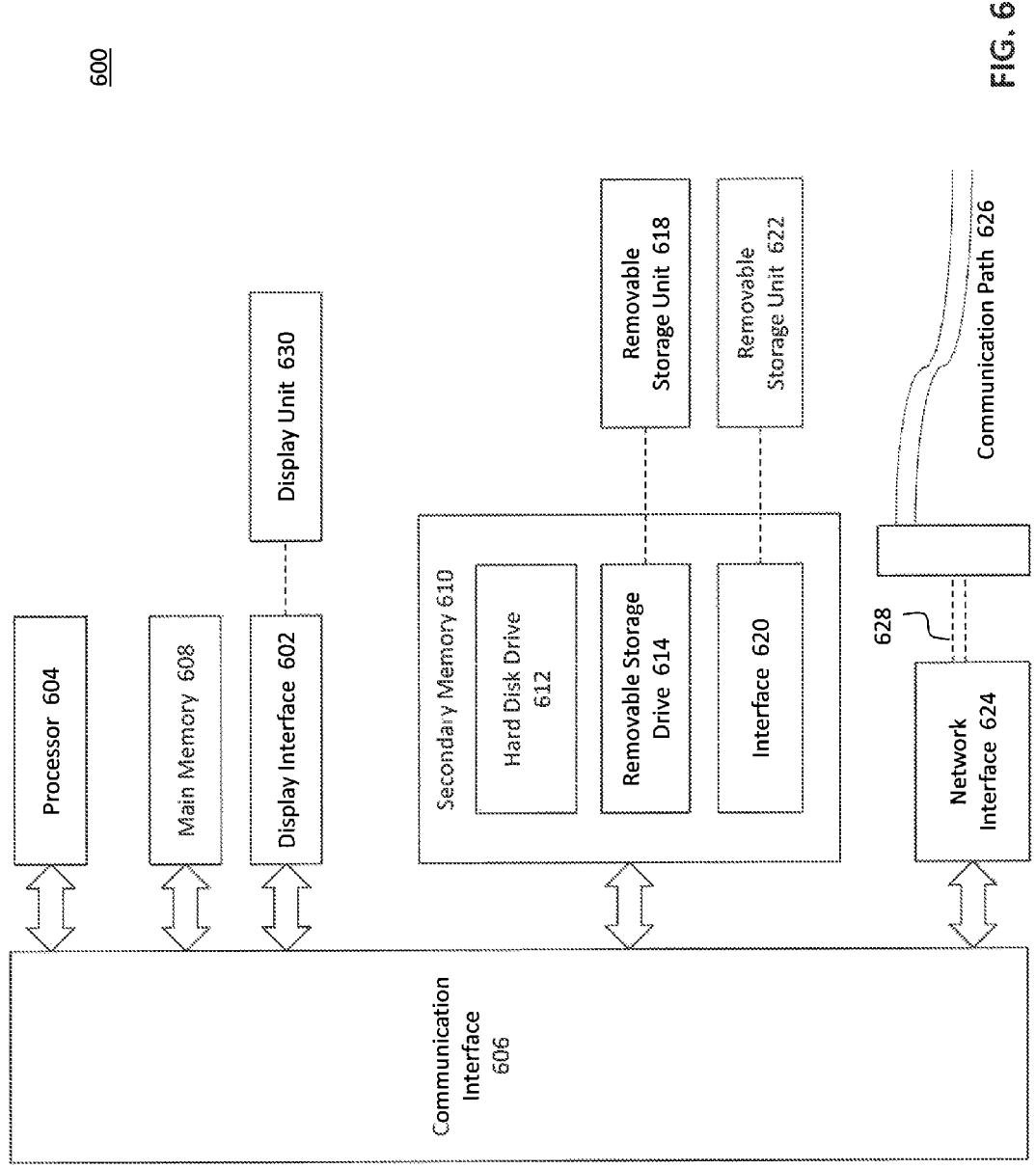
FIG. 6 illustrates a computer system that can be utilized to implement one or more embodiments of the present disclosure.

Various aspects of the present disclosure can be implemented by software, firmware, hardware, or a combination thereof. FIG. 6 illustrates an example computer system 600 in which the present disclosure, or portions thereof, can be implemented as computer-readable code. For example, control logic 305 and/or the methods 400 and 500 can be implemented by computer system 600, as well as the indoor and outdoor positioning logic 307 and 309. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present disclosure. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The disclosure is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the invention should be defined only in accordance with the following claims and their equivalents.

What is claimed is:

1. A method, comprising:
receiving, by an indoor radio receiver, indoor position information from one or more sources inside a structure;
receiving, by an outdoor radio receiver, outdoor position information;
determining, by a processing unit, a difference between a first position of a mobile device determined using the indoor position information and a second position of the mobile device determined using the outdoor position information;
comparing, by the processing unit, the difference with a first threshold;
in response to a determination that the difference is less than the first threshold, determining, by the processing unit, whether the mobile device recently transitioned between indoor and outdoor of the structure within a threshold time period;

in response to a determination that the mobile device recently transition between the indoor and the outdoor of the structure within the threshold time period, concluding, by the processing unit, that the mobile device did not transition from the outdoor to the indoor of the structure and using the second position of the mobile device determined based on the outdoor position information;

in response to a determination that the mobile device did not recently transition between the indoor and the outdoor of the structure within the threshold time period, concluding, by the processing unit, that the mobile device transitioned from the outdoor to the indoor of the structure and using the first position of the mobile device determined based on the indoor position information;

in response to a determination that the difference is greater than the first threshold, comparing, by the processing unit, a signal strength of a signal that was used to derive the outdoor position information with a second threshold;

in response to a determination that the signal strength is less than the second threshold, concluding, by the processing unit, that the mobile device transitioned from the outdoor to the indoor of the structure and using the first position of the mobile device determined based on the indoor position information; and in response to a determination that the signal strength is greater than the second threshold, concluding, by the processing unit, that the mobile device did not transition from the outdoor to the indoor of the structure and using the second position of the mobile device determined based on the outdoor position information.

2. An apparatus, comprising:

an indoor radio receiver configured to receive indoor position information from one or more sources inside a structure;

an outdoor radio receiver configured to receive outdoor position information; and a processor configured to:

determine a difference between a first position of the apparatus determined based on the indoor position information and a second position of the apparatus determined based on the outdoor position information;

compare the difference with a first threshold;

in response to a determination that the difference is less than the first threshold, determine whether the apparatus recently transitioned between indoor and outdoor of the structure within a threshold time period;

in response to a determination that the apparatus recently transitioned between the indoor and the outdoor of the structure within the threshold time period, conclude that the apparatus did not transition from the outdoor to the indoor of the structure and use the second position of the apparatus determined based on the outdoor position information;

in response to a determination that the apparatus did not recently transition between the indoor and the outdoor of the structure within the threshold time period, conclude that the apparatus transitioned from the outdoor to the indoor of the structure and use the first position of the apparatus determined based on the indoor position information;

in response to a determination that the difference is greater than the first threshold, compare a signal strength of a signal that was used to derive the outdoor position information with a second threshold;

in response to a determination that the signal strength is less than the second threshold, conclude that the apparatus transitioned from the outdoor to the indoor of the structure and use the first position of the apparatus determined based on the indoor position information; and in response to a determination that the signal strength is greater than the second threshold, conclude that the apparatus did not transition from the outdoor to the indoor of the structure and use the second position of the apparatus determined based on the outdoor position information.

3. The apparatus of claim 2, wherein the one or more sources inside the structure include one or more radio frequency (RF) sources including an access point or a near field communication device.

4. The apparatus of claim 2, wherein the outdoor radio receiver is configured to receive the outdoor position information from one or more satellites.

* * * * *